United States Patent [19]
Beres

[11] Patent Number: 5,791,479
[45] Date of Patent: Aug. 11, 1998

[54] CUTTING BOARD AND STORAGE METHOD AND APPARATUS

[76] Inventor: William J. Beres, 142 Luther Ave., Hopelawn, N.J. 08861

[21] Appl. No.: 722,311

[22] Filed: Sep. 27, 1996

[51] Int. Cl.$^6$ .................................................. B65D 81/00
[52] U.S. Cl. .................. 206/541; 206/315.11; 220/345; 220/212
[58] Field of Search .................... 220/345, 212, 220/212.5; 206/216, 217, 218, 315.11, 541; 43/54.1, 55

[56] References Cited

U.S. PATENT DOCUMENTS

| | | | |
|---|---|---|---|
| 3,009,187 | 11/1961 | Barba et al. | 220/345 X |
| 3,317,097 | 5/1967 | Giordano | 220/345 X |
| 4,196,538 | 4/1980 | Crone | 206/315.11 X |
| 4,936,449 | 6/1990 | Conard et al. | 206/366 |
| 5,024,326 | 6/1991 | Sandel et al. | 206/366 |
| 5,371,968 | 12/1994 | Casey | 206/315.11 |
| 5,415,315 | 5/1995 | Ramirez | 220/345 |
| 5,593,061 | 1/1997 | Prochnow | 206/315.11 X |
| 5,636,469 | 6/1997 | Pizzolo et al. | 206/315.11 |

*Primary Examiner*—Jacob K. Ackun
*Attorney, Agent, or Firm*—Walter Tencza, Jr.

[57] ABSTRACT

A combination cutting board and storage container is disclosed. The combination cutting board and storage container can be used for food processing and storage purposes, for fishing bait and tackle processing and storage purposes, and for many other purposes. A storage container in the form of a bin has an opening at the top. The cutting board is formed so that it can fit over the opening. Attachment means are preferably provided for holding the cutting board to the bin. A handle is provided for carrying the combination cutting board and storage bin. The handle is preferably in the form of an arc which extends approximately from one end of the bin to the other. The handle, the side members, and the bin are preferably comprised of polyethylene foam or some other lightweight foam material.

5 Claims, 5 Drawing Sheets

CUTTING BOARD AND STORAGE METHOD AND APPARATUS

FIELD OF THE INVENTION

This invention relates to the field of food processing and storage devices and to fishing bait and tackle processing and storage devices.

BACKGROUND OF THE INVENTION

Various apparatus and methods are known in the art for processing and storage of food. Such devices include conventional cutting boards which are comprised of a hard, thick, flat surface, such as wood or hard plastic. Containers for storing food such as "TUPPERWARE" (trademark) products, i.e. plastic storage containers or bins which seal tightly, are also known.

Various apparatus and methods are also known for processing and storing bait, tackle and other fishing accessories. Conventional tackle boxes made of thin metal or plastic allow the storage of hooks, bait and other fishing accessories. Conventional cutting boards, such as disclosed above, are also used for cutting bait by fishermen.

SUMMARY OF THE INVENTION

The present invention in one embodiment is comprised of both a cutting board and a storage container. The combination cutting board and storage container can be used for food processing and storage purposes, for fishing bait and tackle processing and storage purposes, and for many other purposes.

The storage container is preferably a bin having an opening on the top. The cutting board is preferably formed so that it can fit over the opening. Attachment means are preferably provided for holding the cutting board to the bin. The attachment means may be comprised of hinges which connect the cutting board to the bin. The attachment means may alternatively be comprised of flanges which allow the cutting board to slide on top of the bin. The flanges preferably hold the cutting board substantially in place to prevent sliding.

In one embodiment of the present invention a handle is provided for carrying the combination cutting board and storage bin. The handle is preferably in the form of an arc which extends approximately from one end of the storage bin to the other. Side members can also be provided to provide an area where the arc handle can connect. The side members may also be hollow to provide storage space for drinking receptacles or containers used for fishing bait and accessories.

The handle, the side members, and the storage bin are preferably comprised of polyethylene or some other lightweight foam material.

DETAILED DESCRIPTION OF THE DRAWINGS

Figure 1:
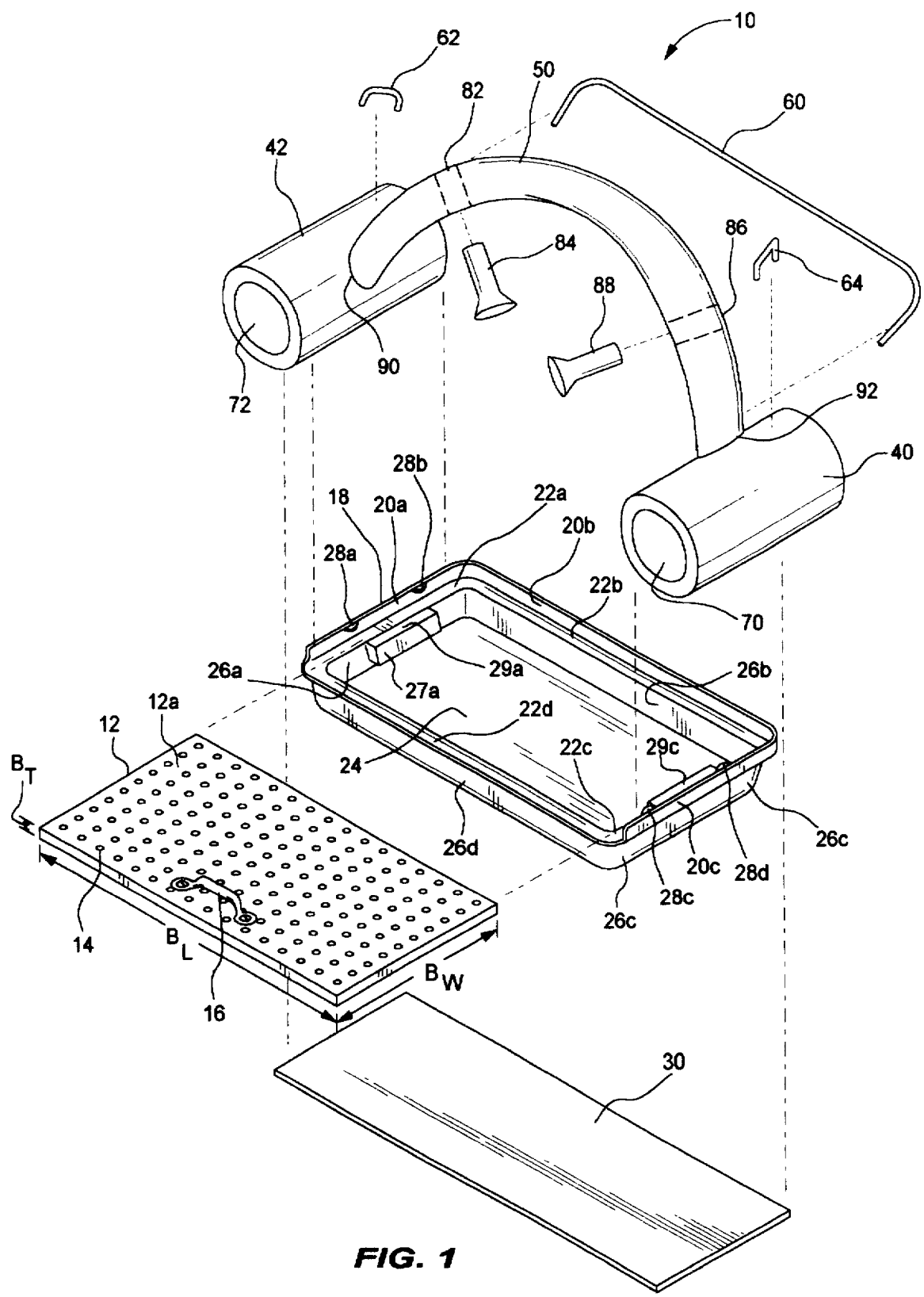
FIG. 1 shows a perspective exploded view of a combination cutting board and storage bin in accordance with a first embodiment of the present invention.
Figure 2:
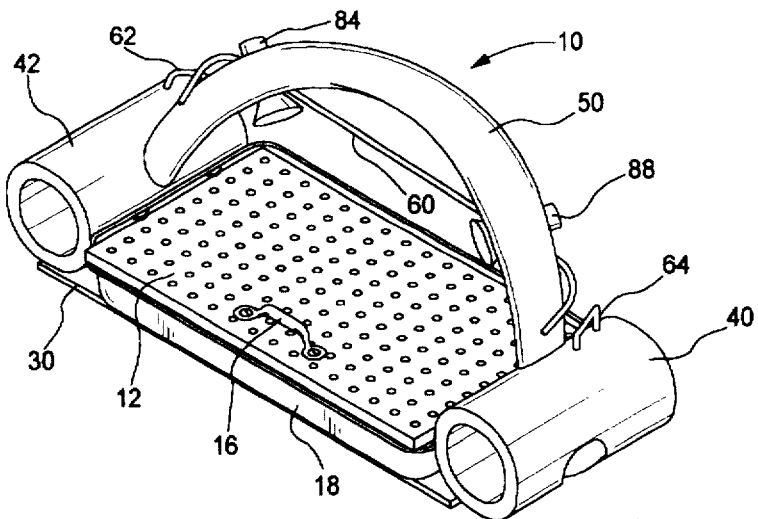
FIG. 2 shows a perspective intact view of the combination cutting board and storage bin in accordance with a first embodiment of the present invention.
Figure 3:
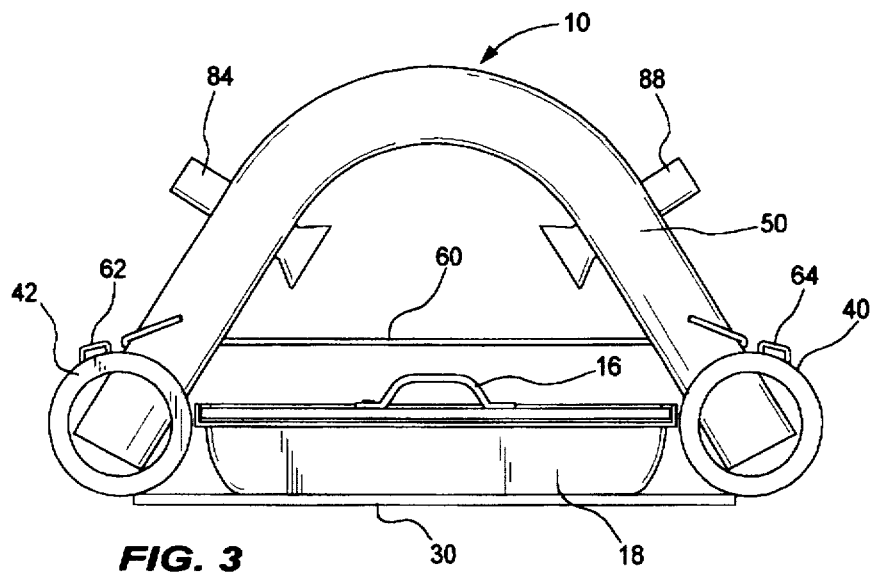
FIG. 3 shows a frontal view of the first embodiment of the present invention.
Figure 4:
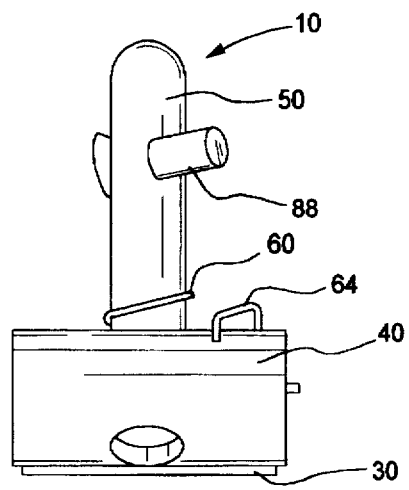
FIG. 4 shows a side view of the first embodiment of the present invention.

FIG. 1 shows a perspective exploded view of a combination cutting board and storage bin 10 in accordance with a first embodiment of the present invention. FIG. 2 shows an intact view of the same cutting board and storage bin 10. FIG. 3 shows a frontal view, and FIG. 4 a side view of the same cutting board and storage bin 10. Cutting board and storage bin 10 is comprised of cutting board 12, storage bin 18, bottom portion 30, side members 40 and 42, arc handle 50, and metal retainer 60.

The cutting board 12 is preferably made of a hard and thick material. The thickness of cutting board 12, $B_T$, shown in FIG. 1, can be for example ½ (one-half) inch thick. The cutting board 12 is made hard and thick so that foods or fish bait can be cut on its surface 12a without significantly deforming the surface 12a. The cutting board 12 surface 12a should be smooth, preferably along the entire surface 12a. The cutting board 12 can be a wood pegboard as shown in FIG. 1, having a plurality of holes 14. For other purposes where a seal is important there may be no holes on the surface 12a of the cutting board 12. The cutting board 12 length $B_L$ and width $B_W$, shown in FIG. 1, may be thirteen inches long and 10 inches wide, respectively. The cutting board 12 shown in FIG. 1 is a rectangular shape however other shapes such as triangular, circular or square are also contemplated.

The storage bin 18 is comprised of raised outer edges 20a, 20a, and 20c, which prevent the cutting board 12 from sliding horizontally in three directions, after the cutting board 12 has been inserted on top of storage bin 18. The storage bin 18 is also comprised of flat surfaces 22a, 22b, 22c, and 22d, which support the cutting board 12 after it is slid on top of storage bin 18. The storage bin 18 is also comprised of flat surfaces 29a and 29c which are level with 22a and 22c respectively. The additional flat surfaces 29a and 29c are preferably centrally located and are used to provide extra support for the cutting board 12. The surfaces 29a and 29c may be provided at the top of a hard solid block such as block 27a. Again this block 27a provides extra strength so that the cutting board 12 will not fall into the storage bin 18.

The storage bin 18 is also comprised of bottom member 24, side members 26a, 26b, 26c, and 26d. The height of the side members 26a–d is preferably at least six inches. This height is useful for purposes such as storing fishing bait. The storage bin 18 thus resembles a box with the top taken off. The cutting board 12 and storage bin 18 are dimensioned so that the cutting board 12 will slide over the opening at the top of the box-like structure of the storage bin 18 as shown in FIGS. 1 and 2.

The storage bin 18 also includes flanges 28a, 28b, 28c, and 28d. The flanges 28a and 28b extend outward from raised outer edge 20a and the flanges 28c and 28d extend outward from raised outer edge 20c. The flanges 28a and 28b preferably lie at least $B_T$ inches, i.e. the thickness of the cutting board 12, above the flat surface 22a and preferably parallel to the flat surface 22a. Similarly the flanges 28c and 28d lie at least $B_T$ inches above the flat surface 22c and preferably parallel to the flat surface 22c. These dimensions allow the cutting board 12 to slide beneath the flanges 28a–d and above the flat surfaces 22a–d.

The bottom portion 30 is used in the embodiment of FIGS. 1 and 2 to attach the side members 40, 42 and arc handle 50 to the storage bin 18. Any other means such as glue, tape, screws, or any other known means can be used without the need for bottom portion 30. In the embodiment of FIGS. 1 and 2, bottom portion 30 can be glued to side members 40 and 42 and to the bottom of storage bin 18.

The arc handle 50 is preferably made of a solid tubular polyethylene foam. One end of the arc handle 50 is inserted into an aperture 90 of the side member 42 and one end of the arc handle 50 is inserted into an aperture 92 of the side member 40, as shown in FIGS. 1–4. The side members 40 and 42 are preferably made of hollow tubular polyethylene foam. Openings 70 and 72, shown in FIG. 1, in the side members 40 and 42 respectfully, can be used for inserting glasses or coffee cups or in general other rounded tubular drinking receptacles. The openings 70 and 72 are preferably rounded tubular openings for accepting rounded tubular receptacles. However, other types of openings for other receptacles may be provided. The metal retainer 60 can be used to provide support for the arc handle 50 of the combination cutting board and storage bin 10. The metal retainer 60 can be held in place by glue, tape, or any other means in a position shown in FIGS. 2, 3, and 4, to support the arc handle 50. Clips 62 and 64, shown in FIG. 1, can be used to hold flash lights or other objects in place. Such as flash light 80.

Flash lights 84 and 88, shown in FIGS. 1–4, are also provided for use as night lights. The flash lights 84 and 88 are inserted in apertures 82 and 86 respectively. The apertures 82 and 86 may be one and three quarters of an inch in diameter and two inches in diameter, respectively. The apertures 82 and 86 may be eight inches above the cutting board 12 surface. The arc handle 50 is preferably three and one quarter (3 and ¼) inches in diameter. This diameter provides sufficient diameter for the flashlight apertures 82 and 86 without seriously affecting the durability of arc handle 50.

A push-pull handle 16 can be used to push the cutting board 12 over the storage bin 18 or to pull the cutting board 12 off the storage bin 18. The push-pull handle 16 can be screwed, nailed, glued or attached in any other manner to the cutting board 12. An aperture can be used instead of push-pull handle 16 or any other known device can be used.

The polyethylene foam material provided for the side members 40 and 42 allows the entire cutting board and storage bin device 10 to float in water. This can be useful if the cutting board and storage device 10 accidently falls into water or if it is used for a purpose where it is constantly in water. It is preferable that the storage bin 18 also be made out of polyethylene foam material so that the cutting board and storage bin device 10 can be lightweight. This would also allow the cutting board and storage device 10 to more easily float, if needed.

Figure 5:
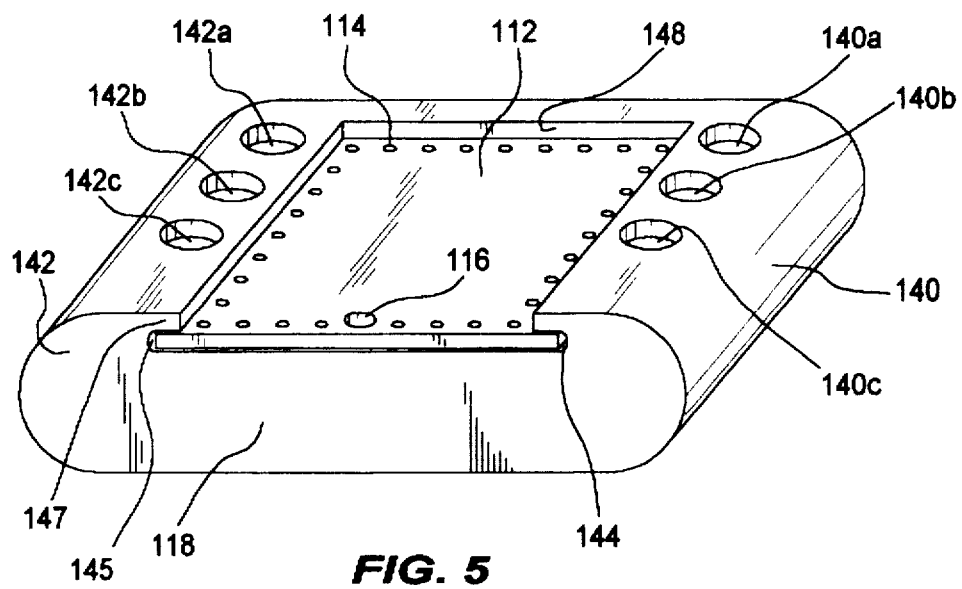
FIG. 5 is a perspective view of a second embodiment of the present invention where the storage bin and side members are molded into a smooth shape and wherein the arc handle portion is not shown.
Figure 6:
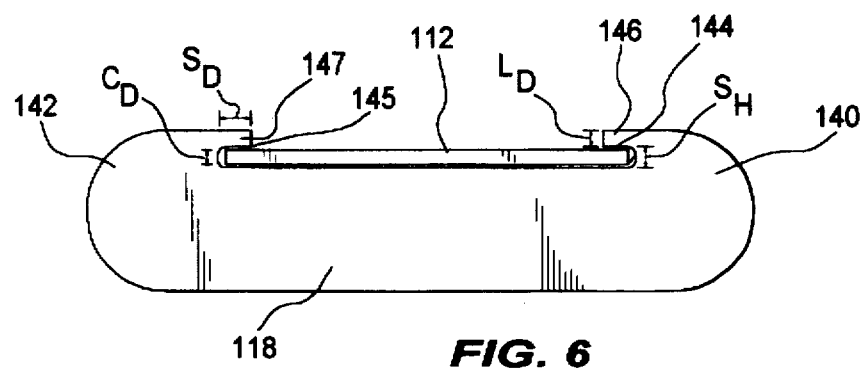
FIG. 6 is a front view of the second embodiment of the present invention wherein the arc handle portion is not shown.
Figure 7:
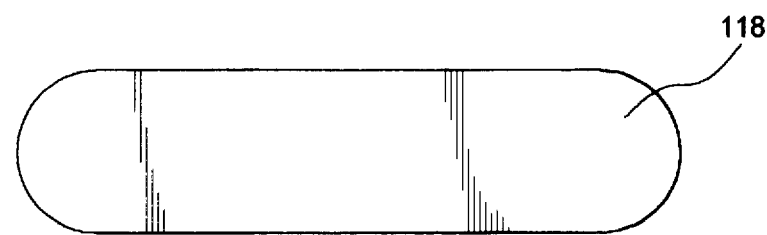
FIG. 7 is a back view of the second embodiment of the present invention wherein the arc handle portion is not shown.
Figure 8:
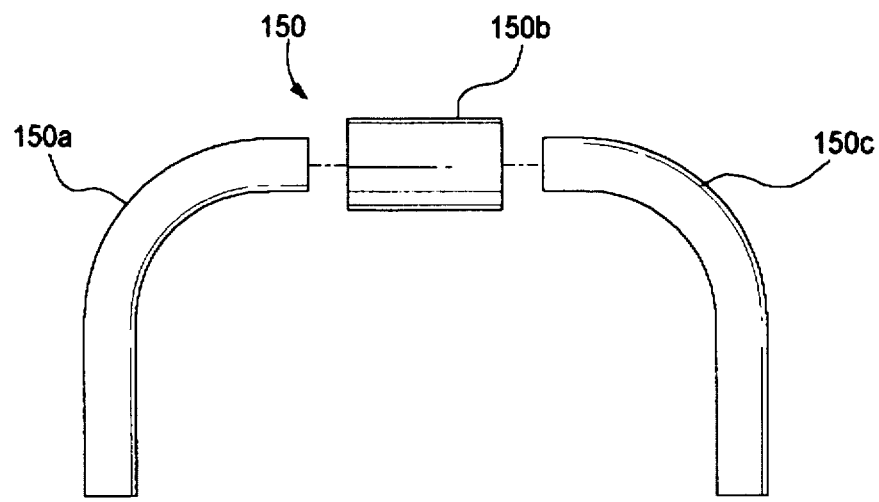
FIGS. 8 and 9 are diagrams of two arc handles in accordance with an embodiment of the present invention.
Figure 9:
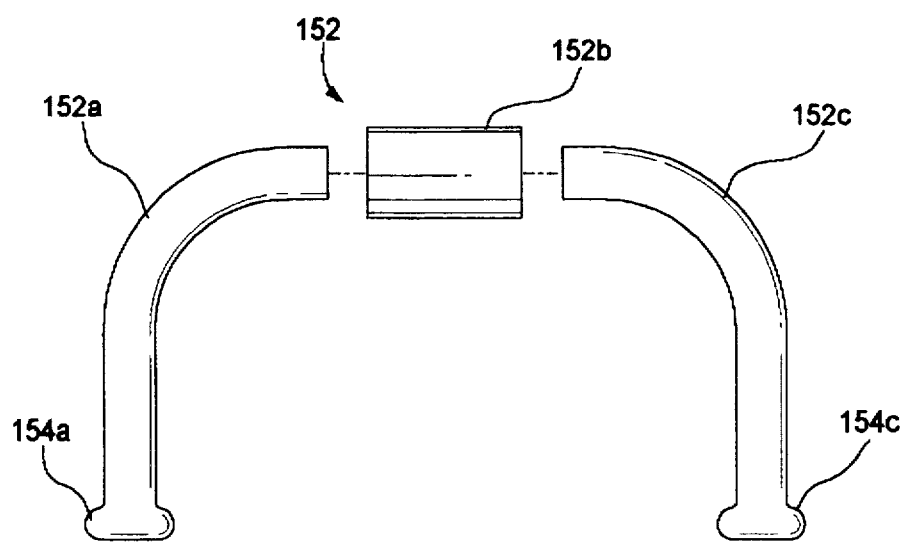
Figure 10:
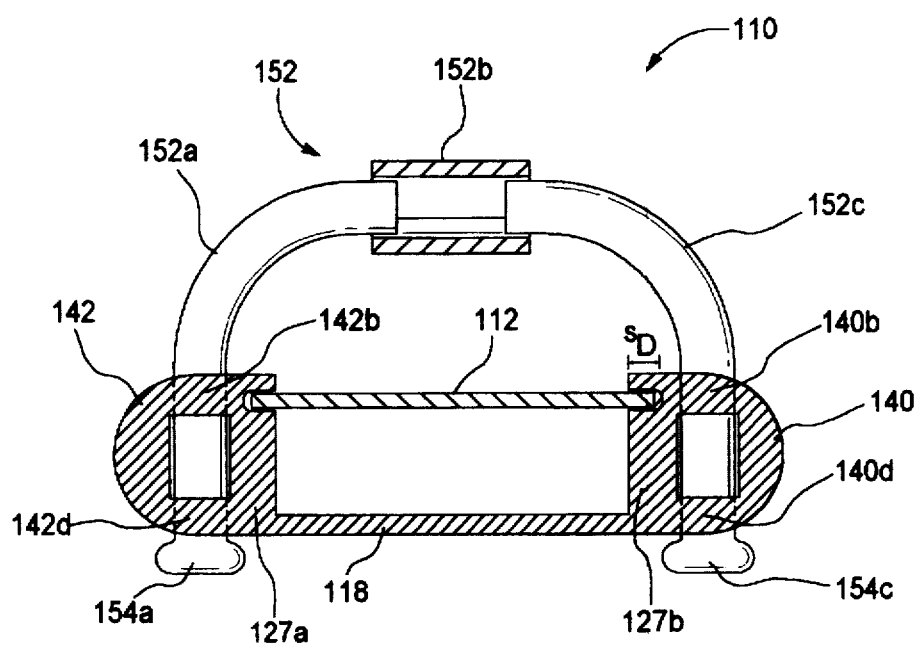
FIG. 10 is a cross sectional view of the second embodiment of the present invention including one form of the arc handle portion.

Another embodiment of the present invention is shown in FIGS. 5 through 10. FIGS. 5, 6, and 7 show perspective, front, and back views, respectively, of a cutting board and storage bin 110 with the exception that an arc handle is not shown. FIGS. 8 and 9 show two different types of arc handles 150 and 152, which can be used with the embodiment of FIG. 5 or to replace the arc handle 50 in the embodiment of FIG. 1. FIG. 10 shows a cross sectional view of the cutting board and storage bin 110 which includes the arc handle 152.

The cutting board and storage bin 110 is comprised of a storage bin 118 and side members 142 and 140. However, the storage bin 118 and side members 142 and 140 make up a single unitary mold. Each of the side members 142 and 140 has three apertures, 142a–c, and 140a–c respectively, as shown in FIG. 5. In one of these apertures an end of an arc handle, such as arc handle 150 or 152, can be placed, as will be later described. The side members 142 and 140 are each comprised of a slot. Side member 142 has a slot 145 and side member 140 has a slot 144, as shown in FIG. 5 and 6. Slots 144–145 each have a height of $S_H$, as shown in FIG. 6. This height allows the cutting board 112, which has a height of $C_D$, which is less than $S_H$ to be slid inside the slots 144 and 145.

The cutting board 112 is prevented from being pulled off the storage bin 118 by lips 147 and 146 which hang above the slots 145 and 144 respectively, as shown in FIGS. 5 and 6. The depths, $S_D$ of the slots 144 and 145, as shown in FIG. 6 are preferably each 1 inch although other depths can be provided. The slots 144 and 145 are preferably created during the molding process of the storage bin 118. The depth of the lips 146 and 147, shown in FIG. 6 as $L_D$ is preferably ½ (one-half) inch which corresponds to the thickness of the cutting board. There is also preferably a lip 148, shown in FIG. 6, at the back of the storage bin 118. The cutting board 112 preferably also slides under this lip similar to lips 147 and 146.

The arc handle 150 shown in FIG. 8 is comprised of tubes 150a and 150c and joint 150b. The joint 150b should be hollow so that an end of tube 150a and an end of tube 150c can fit inside it as shown in FIG. 10 for arc handle 152. The arc handle 152 shown in FIG. 9 is comprised of tube 152a and 152c, and joint 152b. Again one end of each of the tubes 152a and 152c should fit inside the joint 152b as shown in FIG. 10 and therefore joint 152b should be hollow. The tubes 152a and 152c also include knob portions 154a and 154c. These knob portions prevent the tubes 152a and 152c from falling out of the apertures in side members 142 and 140 respectively as shown in FIG. 10.

In order to apply the tube 152a to the side member 142, the end of the tube 152a without the knob would be thrust through the aperture 142d at the bottom of the side member 142 and then upwards through the aperture 142b at the top of the side member 142, as shown in FIG. 10. Similarly the end of the tube 152c without the knob would be thrust upwards through the aperture 140d at the bottom of the side member 140 and upwards through the aperture 140b at the top of the side member 140. The non-knob ends of the tube 152a and 152c would be inserted into the hollow joint 152b as shown in FIG. 10.

The cross sectional view of the combination cutting board and storage bin 110 shown in FIG. 10 also shows block sections 127a and 127b, which prevent the cutting board from falling to the bottom of the storage bin 118. The storage bin 118, which is preferably formed from the same unitary mold as the side members 140 and 142, and the arc handle 150 are all preferably comprised of polyethylene foam. Only the cutting board 112 is preferably comprised of a different material such as wood or metal.

The aperture 140b in conjunction with the aperture 140d goes all the way through the side member 140, as shown in FIG. 10. The combination aperture 140b and 140d is preferably used for the insertion of the arc handle, such as arc handle 152 or 150. The apertures 140b and 140d may be three inches in diameter. The apertures 142b and 142d may be similar to the apertures 140b and 140d. The apertures 140a and 140c, and 142a and 142c, are preferably three and one-quarter (3 and ¼) inches in diameter and preferably extend to only 1 inch from the bottom of their appropriate side members 140 or 142. The apertures 140a, 140c, 142a, and 142c are preferably used for storage of other items such as hooks, sinkers, swivels, or other fishing accessories, when the combination cutting board and storage bin 110 is used for fishing purposes.

Large hole 116, shown in FIG. 5, is used as a push-pull handle to pull the cutting board 112 off of the storage bin 118 or to push the cutting board 112 onto the storage bin 118. A plurality of optional air holes 114 are shown on the periphery of the cutting board 112. For fishing bait purposes these holes 114 allow added ventilization.

Other embodiments in accordance with the present invention will be readily apparent to those skilled in the art. For example, The arc handle, such as arc handle 150, may be formed in conjunction with the storage bin, such as storage bin 118, and the side members, such as side members 140 and 142.

The present invention is also suitable as a picnic basket to store food items such as fast food. When used as a picnic basket the cutting board portion may or may not be provided. The present invention is also suitable for use as a storage box for activities such as shell collecting, rock collecting, and other activities. The present invention is particularly suitable for use as a bait and tackle box for storage of lures, hooks and flies in the storage bin, such as storage bin 118. The arc handle 150 in FIGS. 8-10 or the arc handle 50 in FIGS. 1-4, when provided in polyethylene foam form is particularly suitable for safely attaching hooks and lures to. Hooks, lures, and knifes which have sharp edges can actually be stored in the polyethylene foam by simply inserting the sharp edge into the foam. No advance opening or aperture is needed in the foam. Rather, the insertion of the sharp edge creates an opening. After insertion the foam elastically retains the sharp edged objects. The sharp edged objects can be removed when needed and reinserted when not needed. The combination storage bin and cutting board when provided in polyethylene form is advantageously not subject to rust, is lightweight and can be manufactured in bright colors for night visability.

The present invention provides an efficient method and apparatus of organizing fishing bait and accessories. It also provides an all in one design for cutting and transporting bait as well as providing a receptacle for inserting a flash light for the purpose of cutting bait at night.

I claim:

1. An apparatus comprising:

a storage bin comprised of a top opening and two opposing sides;

a rigid board covering a substantial portion of the top opening;

a handle device for picking up the rigid board and storage bin, the handle device having two ends, the handle device in the form of an arc having a crest which is used as a handle, the handle device provided with one or more apertures along its arc form;

wherein one end of the handle device is attached to one opposing side of the storage bin and the other end of the handle device is attached to the other opposing side of the storage bin; and wherein a flash light is inserted in one or more apertures along the arc form of the handle device.

2. The apparatus of claim 1 wherein the handle device and the storage bin are comprised of a foam material.

3. The apparatus of claim 2 wherein the handle device and the storage bin are comprised of polyethylene foam.

4. An apparatus comprising:

a storage bin comprised of a top opening;

a rigid board covering a substantial portion of the top opening;

a floatation means which allows the storage bin to float when placed in water wherein the floatation means is attached to the storage bin, so that the floatation means lies outside the storage bin;

and wherein the storage bin is comprised of a first side member and a second side member, the floatation means is comprised of a first hollow tube and a second hollow tube, wherein the first hollow tube is attached to the storage bin, at a location adjacent the first side member;

the second hollow tube is attached to the storage bin, at a location adjacent the second side member; and the first side member and the second side member substantially oppose one another.

5. The apparatus of claim 4 and wherein the storage bin comprises a bottom member and the first and second hollow tubes are attached to the storage bin so that when the bottom member lies flat, the first and second hollow tubes lie flat.

* * * * *